United States Patent
Isobe et al.

[11] Patent Number: 6,014,418
[45] Date of Patent: Jan. 11, 2000

[54] FUEL ROD FOR LIGHT WATER REACTOR AND METHOD FOR MANUFACTURING THE SAME

[75] Inventors: Takeshi Isobe; Yoshiharu Mae, both of Omiya; Toshimichi Takahashi, Hyogo-ken; Yoshitaka Suda, Ibaraki-ken; Akio Sando, Ibaraki-ken; Eiji Yoneda, Ibaraki-ken, all of Japan

[73] Assignees: Mitsubishi Materials Corporation; Mitsubishi Heavy Industries, Ltd; Mitsubishi Nuclear Fuel Co., Ltd., all of Tokyo, Japan

[21] Appl. No.: 08/908,694

[22] Filed: Aug. 8, 1997

[30] Foreign Application Priority Data

Sep. 8, 1996 [JP] Japan ................................. 8-211281

[51] Int. Cl.[7] ................................................... G21C 21/02
[52] U.S. Cl. ........................... 376/261; 376/451; 376/457; 420/422; 148/407; 428/660; 228/262.71; 219/137 WM
[58] Field of Search ..................... 376/260, 261, 376/451, 457; 420/422; 148/407, 421, 672; 428/660; 228/262.71; 219/137 WM

[56] References Cited

U.S. PATENT DOCUMENTS

| | | | |
|---|---|---|---|
| 4,649,023 | 3/1987 | Sabol et al. | 420/422 |
| 4,921,663 | 5/1990 | Boatwright | 376/451 |
| 4,938,920 | 7/1990 | Garzarolli et al. | 376/457 |
| 5,112,573 | 5/1992 | Foster et al. | 420/422 |
| 5,158,740 | 10/1992 | Boatwright | 376/451 |
| 5,230,758 | 7/1993 | Foster et al. | 420/422 |

FOREIGN PATENT DOCUMENTS 48-33858  10/1973  Japan .

OTHER PUBLICATIONS

English Abstract of JP 33828, (Oct. 1973).

*Primary Examiner*—Daniel D. Wasil
*Attorney, Agent, or Firm*—Oblon, Spivak, McClelland, Maier & Neustadt, P.C.

[57] ABSTRACT

A fuel rod for a light water reactor comprises a cladding tube which comprises a zirconium alloy having a composition including 0.6 to 2.0% by weight of Nb, 0.5 to 1.5% by weight of Sn, 0.05 to 0.3% by weight of Fe, and the balance being Zr and incidental impurities; uranium oxide fuel pellets packed in the cladding tube; and end plugs comprising a zirconium alloy and closing both ends of the cladding tube. The cladding tube is sealed by TIG welding with the end plugs. Grain boundaries in each heat affected zone of the cladding tube, which are adjacent to a bead formed by TIG welding, have structural compositions including 4 to 30% by weight of Nb, and 0.9 to 20% by weight of Fe.

22 Claims, 2 Drawing Sheets

FUEL ROD FOR LIGHT WATER REACTOR AND METHOD FOR MANUFACTURING THE SAME

BACKGROUND OF THE INVENTION

1. Field of the Invention

The present invention relates to a fuel rod for a light water reactor and a method for manufacturing the same.

2. Description of the Background

Recently, increasing importance has been given to nuclear power generation as a source of electrical power. In response, there has been an increased demand for the efficient operation of nuclear power plants. For nuclear power plants to operate efficiently, it is necessary to operate the light water reactors inside the plants efficiently. Improving the corrosion resistance of fuel rods would reduce the frequency of their replacement and improve the efficiency of the nuclear power plants.

A fuel rod comprise a zirconium cladding tube and $UO_2$ fuel packed inside. As is shown in the cross section FIG. 1, a fuel rod 1 for a light water reactor is constructed as follows: $UO_2$ fuel pellets 3 are packed one on top of another into a cladding tube 2 which comprises a zirconium alloy, such as Zircaloy-2 (JIS H4751ZrNT802D) or Zircaloy-4 (JIS H4751ZrNT804D). Both ends of the cladding tube 2 are then capped with end plugs 4 while the $UO_2$ fuel pellets 3 are pressed with a spring 5, and are sealed by TIG welding. Beads 6 formed at the welded portions by the TIG welding are approximately 2 mm in width, and heat affected zones 7, similarly having widths of approximately 2 mm, are formed on both side areas of each bead. When the TIG welded portions are allowed to cool as they are, the heat affected zones 7 are ordinarily considered to be cooled at a cooling rate of approximately 100° C./sec.

Before welding, the cladding tube 2 has a worked grain structure, while the end plugs 4 have equiaxed grain structures. The TIG welding changes the structure of the beads 6 and the heat affected zones 7. The beads 6 have a very fine acicular grain structure, which results from rapid cooling from the liquid phase. On the other hand, the heat affected zones 7 have a combined grain structure, of equiaxed grain structure 8 and acicular grain structure 9, as shown in FIG. 2, which results from rapid cooling from the β (b.c.c.) phase or from a temperature within a range where u and p phases coexists. The β (b.c.c.) phase is a zirconium phase stable at high temperature.

Sufficient corrosion resistance for long periods is not achieved in fuel rods which use a cladding made of conventional Zircaloy-2 or Zircaloy-4. A more corrosion resistant zirconium alloy, as compared with conventional Zircaloy-2 or Zircaloy-4, has a composition which includes 0.6 to 2.0% by weight of Nb, 0.5 to 1.5% by weight of Sn, 0.05 to 0.3% by weight of Fe, and the balance being Zr and incidental impurities (hereinafter, this zirconium alloy will be referred to as a zirconium alloy containing Nb and Fe) (cf. Japanese Unexamined Patent Publications No. 61-170552, No. 1-188643, No. 2-4937, and No. 3-90527, Japanese Examined Patent Publications No. 7-6018 and No. 7-6019, and others). When a cladding tube 2 comprising this zirconium alloy containing Nb and Fe is used, the heat affected zones 7, obtained by allowing the TIG welded portions to cool, have grain structures as shown in FIG. 2. The Nb and Fe segregate at grain boundaries 10 between an equiaxed grain structure 8 and an equiaxed grain structure 8, between an equiaxed grain structure 8 and an acicular grain structure 9, and between an acicular grain structure 9 and an acicular grain structure 9. The concentrations of Nb and Fe at these boundaries are at most 3.5% and 0.6% by weight, respectively.

In general, fuel rods made from cladding tubes comprising the aforementioned zirconium alloy containing Nb and Fe, charged with $UO_2$ fuel, have improved corrosion resistance when compared to cladding tubes comprising conventional Zircaloy-2 or Zircaloy-4. In some cases, however, the heat affected zone of these tubes have inferior corrosion resistance as compared to cladding tubes comprising Zircaloy-2 or Zircaloy-4.

The rate of corrosion of a fuel rod in a nuclear reactor may be evaluated outside the reactor by, for example, an autoclave test, which is performed at a temperature of 360° C. under saturated water vapor pressure, i.e. approximately 190 atm. A sample fuel rod was constructed using a cladding tube comprising the aforementioned zirconium alloy containing Nb and Fe, the cladding tube was sealed with end plugs comprising Zircaloy-4 by TIG welding, and the sample was subjected to an autoclave test for 120 days under the above-described conditions. It was revealed that the be affected zones of the end plugs, were covered with a black oxide film similar to the non-welded portions. The portions covered with this black oxide film had satisfactory corrosion resistance. A white oxide film was formed on the heat affected zones of the cladding tube comprising the zirconium alloy containing Nb and Fe. The portions where this white oxide film was formed had extremely low corrosion resistance. The reduction in corrosion resistance caused by formation of this white oxide film on the heat affected zones of the cladding tube having a thin wall leads to an extreme reduction in the life span of a fuel rod for a light water reactor.

SUMMARY OF THE INVENTION

The present inventors studied the white oxide film formed on heat affected portions of a cladding tube comprising a zirconium alloy containing Nb and Fe, and discovered the following. In a fuel rod obtained by TIG welding a cladding tube comprising the aforementioned zirconium alloy containing Nb and Fe together with end plugs, when the heat affected zones formed on the cladding tube are cooled at a cooling rate of 70° C./sec. to 5° C./sec., which is slower than the cooling rate ordinarily employed for cooling heat affected zones, the amounts of Nb and Fe which segregate at grain boundaries in the heat affected zones greatly increase, to reach 4.0 to 30% by weight of Nb and 0.9 to 20% by weight of Fe. In the heat affected zones of the cladding tube which include grain boundaries having this segregation of the Nb and Fe concentrations, a white oxide film is not generated and corrosion resistance is greatly improved. The present invention has been accomplished based on such findings.

The present invention provides a weld of a zirconium alloy rod, comprising a bead and a heat affected zone adjacent to said bead, wherein grain boundaries in the heat affected zone comprises 4.0 to 30% by weight Nb and 0.9 to 20% by weight Fe.

The present invention also provides a fuel rod, comprising a cladding tube, end caps, and the weld described above, connecting said cladding tube and said end caps.

The present invention also provides a method of enhancing the corrosion resistance of a weld, comprising cooling a heat-affect zone of said weld at a rate of 5–70° C./sec.; wherein said heat affected zone has been prepared by welding a cladding tube and an end plug together, wherein said cladding tube comprises 0.6 to 2.0% by weight of Nb, 0.5 to 1.5% by weight of Sn, 0.05 to 0.3% by weight of Fe, and Zr and incidental impurities.

The present invention also provides a method of making a fuel rod, comprising sealing by welding a cladding tube and end plugs, thereby forming beads and heat affected zones adjacent to said beads; and cooling said heat-affect zones at a rate of 5–70° C./sec.; wherein said cladding tube comprises 0.6 to 2.0% by weight of Nb, 0.5 to 1.5% by weight of Sn, 0.05 to 0.3% by weight of Fe, and Zr and incidental. Finally, the present invention also includes generating heat by fissioning a nuclear fuel in the fuel rod of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

The Figures the following reference numbers.

Figure 1:
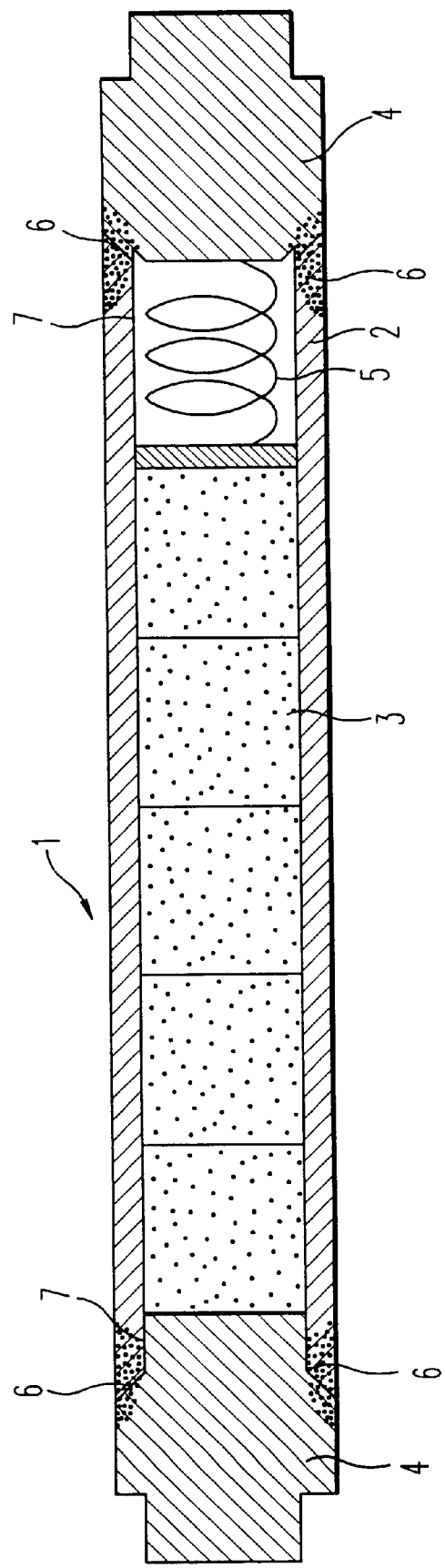
FIG. 1 shows a diagram for illustrating the structure of a fuel rod for a light water reactor.
Figure 2:
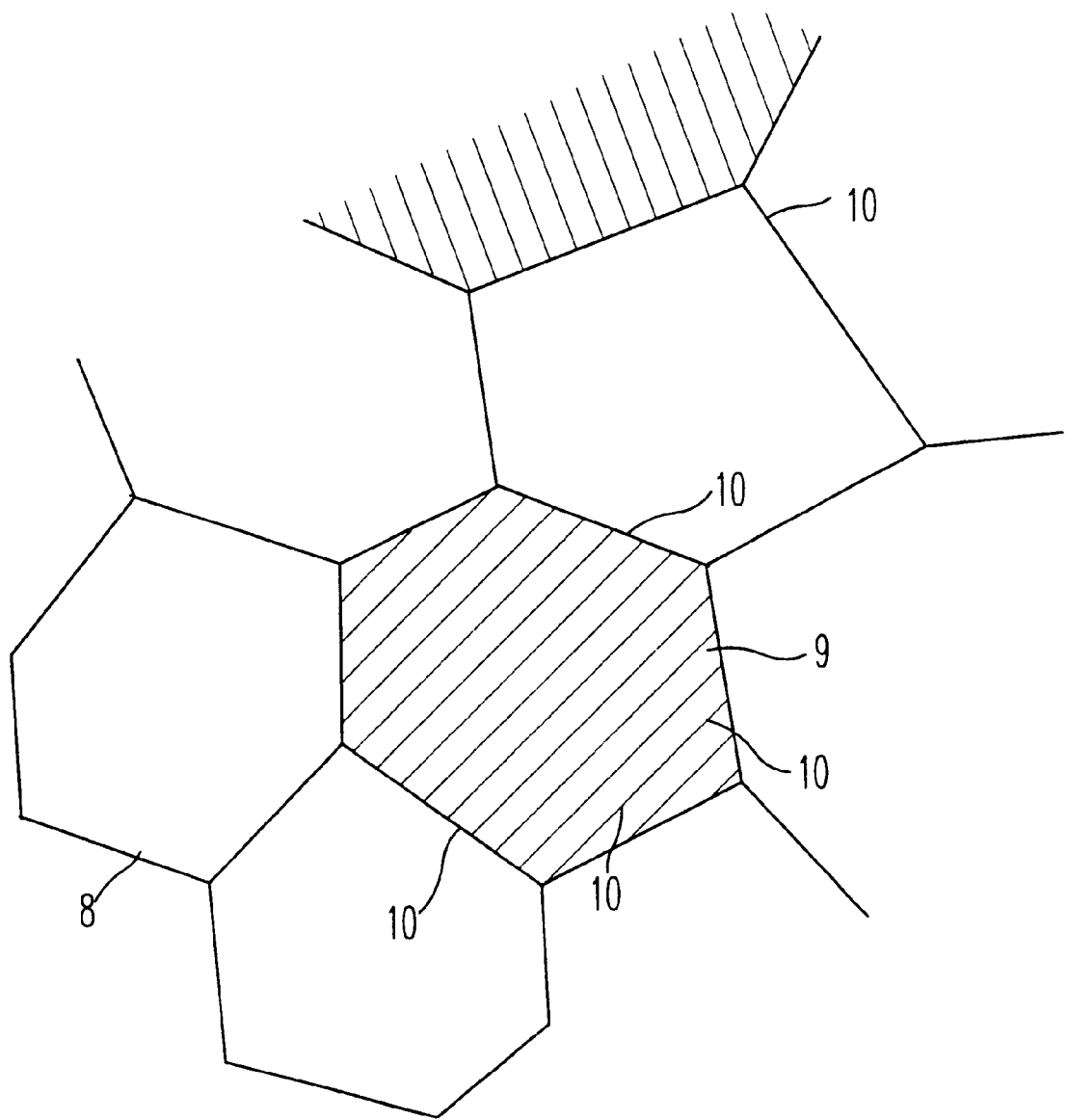
FIG. 2 shows a diagram for illustrating grain boundaries in the structure of a heat affected zone formed by TIG welding a cladding tube which comprises a zirconium alloy containing Nb and Fe.

1 fuel rod
2 cladding tube
3 $UO_2$ fuel pellet
4 end plug
5 spring
6 bead
7 heat affected zone
8 equiaxed structure
9 acicular structure
10 grain boundary

DETAILED DESCRIPTION OF THE INVENTION

The present invention may provide (1) A fuel rod for a light water reactor, comprising a cladding tube which comprises a zirconium alloy containing Nb and Fe; uranium oxide fuel pellets packed in said cladding tube; and end plugs comprising a zirconium alloy and closing both ends of said cladding tube, said cladding tube being sealed with said end plugs by TIG welding, wherein grain boundaries in each heat affected zone of said cladding tube adjacent to a bead formed by TIG welding of said cladding tube with said end plug have structural compositions including 4 to 30% by weight of Nb, and 0.9 to 20% by weight of Fe.

The present invention may also provide (2) a method for manufacturing a fuel rod for a light water reactor, comprising:

packing uranium oxide fuel pellets into a cladding tube which comprises a zirconium alloy containing Nb and Fe;

closing both ends of said cladding tube with end plugs comprising a zirconium alloy; and sealing by TIG welding said cladding tube together with said end plugs, wherein:

each heat affected zone of said cladding tube which is adjacent to a bead formed by TIG welding said cladding tube with said end plug is cooled at a rate of 70° C./sec. to 5° C./sec.

According to the present invention, the zirconium alloy containing Nb and Fe for the cladding tube to be used in the fuel rod for a light water reactor has a composition including 0.6 to 2.0% by weight of Nb, 0.5 to 1.5% by weight of Sn, 0.05 to 0.3% by weight of Fe, and the balance being Zr and incidental impurities. Preferably, the zirconium alloy has a composition including 0.8 to 1.2% by weight of Nb, 0.8 to 1.1% by weight of Sn, 0.08 to 0.12% by weight of Fe, and the balance being Zr and incidental impurities. Conventional Zircaloy-2 (JIS H4751ZrNT802D) or Zircaloy-4 (JIS H475 1ZrNT804D) is used for the end plugs which close both ends of the cladding tube comprising the zirconium alloy containing Nb and Fe since the end plugs do not greatly affect the life span of the fuel rod for a light water reactor, even if they are corroded.

A fuel rod for a light water reactor of the present invention comprises a cladding tube which comprises a zirconium alloy containing Nb and Fe; uranium oxide fuel pellets packed in the cladding tube; and end plugs comprising a zirconium alloy and closing both ends of said cladding tube, where the cladding tube is sealed with the end plugs by TIG welding. Grain boundaries in each heat affected zone of the cladding tube which is adjacent to a bead formed by TIG welding have compositions including 4 to 30% by weight of Nb and 0.9 to 20% by weight of Fe. In some cases, where Cr is contained in the alloy as an incidental impurity, Cr can also segregate at grain boundaries and can be detected.

In the fuel rod for a light water reactor according to the present invention, for example, the following methods of cooling while controlling the cooling rate at 70° C./sec. to 5° C./sec. may be employed: (i) TIG welding is carried out while both areas adjacent to each portion to be welded are covered with a heat insulating material, and following sufficient cooling after completion of the welding, the heat insulating material is removed; or (ii) after welding, the cladding tube and end plugs are subjected to induction heating or heating by direct heating with electricity.

When the heat affected zones due to welding are cooled at a cooling rate of greater than 70° C./sec., the concentrations of Nb and Fe at the grain boundaries fall below 4% by weight and 0.9% by weight, respectively, and sufficient corrosion resistance cannot be achieved. On the other hand, when the heat affected zone due to welding is cooled at a cooling rate of less than 5 ° C./sec., further improvement in corrosion resistance cannot be achieved, since the concentrations of Nb and Fe at the grain boundaries in the heat affected zone formed by the welding do not exceed 30% by weight and 20% by weight, respectively, even with a much slower cooling rate. On the contrary, such a slow cooling rate causes the strength of the fuel rod to deteriorate.

EXAMPLES

Example 1

Zirconium alloy cladding samples were prepared which had dimensions of 10 mm in diameter and 0.6 mm in thickness, having a composition including 1.0% by weight of Nb, 1.0% by weight of Sn, 0. 1% by weight of Fe, and the balance being Zr and incidental impurities. Each zirconium alloy cladding sample was TIG welded under the conditions described below at its ends with zirconium alloy end plugs which had a composition including 1.5% by weight of Sn, 0.2% by weight of Fe, 0. 1% by weight of Cr, and the balance being Zr and incidental impurities. The cooling rate at the heat affected zones of each cladding sample was controlled by a method shown in Table 1. As a result, Samples 1 to 6 according to the present invention, Comparative Samples 1 and 2, and Conventional Samples 1 and 2 were manufactured, in which the concentrations of Nb and Fe at grain boundaries in heat affected zones were as shown in Table 1, respectively.

TIG Welding Conditions:

Current: 30 A

Voltage: 15 V

Welding rate: 500 mm/min.

Cooling gas: 25 liter/min. He

Samples 1 to 6 according to the present invention, Comparative Samples 1 and 2, and Conventional Samples 1 and 2, which were zirconium alloy cladding samples having heat affected zones, were subjected to chemical milling in a nitric-hydrofluoric acid solution [$HNO_3$:HF:$H_2O$=45:5:50 (% by volume)] to a thickness 100 μm, and were cut into disks having a diameter of 3 mm. Subsequently, the disks were subject to electrolytic milling under the conditions described below to prepare foil samples for examination by Transmission Electron Microscopy.

Electrolytic Milling Conditions:

Voltage: 20 V

Current: 100 mA

Temperature: −40° C.

Solution: 5% perchloric acid-methanol

The above-obtained foil samples for examination by Transmission Electron Microscopy from Samples 1 to 6 according to the present invention, Comparative Samples 1 and 2, and Conventional Samples 1 and 2 were examined with an accelerating voltage of 200 kV and a magnification of 50,000, and no precipitates of intermetallic compounds were found. Additionally, contents of Nb and Fe at the grain boundaries were measured by Energy Dispersive X-ray Analysis, with the results shown in Table 1.

Samples 1 to 6 according to the present invention, Comparative Samples 1 and 2, and Conventional Samples 1 and 2 were placed in an autoclave, and subject to autoclave tests in purified water having a high temperature of 360° C. for 120 days in order to examine color change in the heat affected zones of the zirconium alloy cladding samples. The results are shown in Table 1.

As shown in Table 1, each heat affected zone of Conventional Samples 1 and 2, which were allowed to cool or were cooled with a cooling rate close to the natural cooling, turned white and had inferior corrosion resistance. On the other hand, each heat affected zone of Samples 1 to 6 according to the present invention and Comparative Samples 1 and 2, which were cooled while controlling the cooling rate at 70 to 5° C./sec., and in which the concentrations of Nb and Fe at the grain boundaries in their structure were 4 to 30% by weight and 0.9 to 20% by weight, respectively, had a black color and had satisfactory corrosion resistance. Comparative Samples 1 and 2 with heat affected zones which cooled at a cooling rate of less than 5° C./sec., were undesirably softened and had insufficient strength.

As described above, the fuel rod for a light water reactor according to the present invention, which has improved corrosion resistance as compared to conventional rods, allows for highly efficient and highly reliable operation, and therefore, greatly contribute to the development of the atomic industry.

Obviously, numerous modifications and variations of the present invention are possible in light of the above teachings. It is therefore to be understood that within the scope of the appended claims, the invention may be practiced otherwise than as specifically described herein.

The priority document of the present application, Japanese Patent Application No. 08-211281, filed on Aug. 9, 1996, is hereby incorporated by reference.

What is claimed as new and is desired to be secured by Letters Patent of the United States is:

1. A weld of a zirconium alloy rod, comprising:

a bead and a heat affected zone adjacent to said bead, wherein grain boundaries in said heat affected zone comprises 4.0 to 30% by weight Nb and 0.9 to 20% by weight Fe.

2. The weld of claim 1, wherein said weld comprises:

0.6 to 2.0% by weight of Nb, 0.5 to 1.5% by weight of Sn, 0.05 to 0.3% by weight of Fe, and Zr and incidental impurities.

3. The weld of claim 1, wherein said weld comprises:

0.8 to 1.2% by weight of Nb, 0.8 to 1.1% by weight of Sn,

TABLE 1

| Sample Type & No. | | Cooling Rate (° C./sec.) | Controlling Method of Cooling Rate | Nb and Fe Concentrations at Grain Boundaries (% by weight) | | Appearance after Autoclave Test (in 360° C. Pure Water for 120 Days) | Remarks |
|---|---|---|---|---|---|---|---|
| | | | | Nb | Fe | | |
| Samples of the Present Invention | 1 | 68 | Removal of the Chilling Block | 4.3 | 0.95 | Black | — |
| | 2 | 45 | Covering with a Heat-Insulating material | 5.2 | 2.7 | Black | — |
| | 3 | 30 | Direct Heat with Electricity | 6.3 | 4.8 | Black | — |
| | 4 | 22 | Induction Heating of the Cladding Tube | 11 | 7.3 | Black | — |
| | 5 | 15 | Induction Heating of the Cladding Tube and the End Plug Portions | 15 | 10 | Black | — |
| | 6 | 6.0 | Induction Heating of the Cladding Tube and the End Plug Portion | 28 | 25 | Black | — |
| Comparative Samples | 1 | 3.8 | Induction Heating of the Cladding Tube and the End Plug Portions | 27 | 23 | Black | Insufficient Strength |
| | 2 | 1.5 | Induction Heating of the Cladding Tube and the End Plug Portions | 25 | 25 | Black | Insufficient Strength |
| Conventional Samples | 1 | 100 | Natural Cooling | 3.1 | 0.50 | White (Peeled) | — |
| | 2 | 80 | Decreasing the Flow of Cooling Gas | 3.3 | 0.65 | White | — |

0.08 to 0.12% by weight of Fe, and

Zr and incidental impurities.

4. The weld of claim 2, wherein said weld consists essentially of Nb, Sn, Fe, Zr and incidental impurities.

5. The weld of claim 3, wherein said weld consists essentially of Nb, Sn, Fe, Zr and incidental impurities.

6. The weld of claim 5, further consisting essentially of Cr.

7. A fuel rod, comprising:

a cladding tube, end caps, and the weld of claim 1, connecting said cladding tube and said end caps.

8. The fuel rod of claim 7, wherein said cladding tube comprises:

0.6 to 2.0% by weight of Nb, 0.5 to 1.5% by weight of Sn, 0.05 to 0.3% by weight of Fe, and Zr and incidental impurities.

9. The fuel rod of claim 7, wherein said cladding tube comprises:

0.8 to 1.2% by weight of Nb, 0.8 to 1.1% by weight of Sn, 0.08 to 0.12% by weight of Fe, and Zr and incidental impurities.

10. The fuel rod of claim 8, wherein said cladding tube consists essentially of Nb, Sn, Fe, Zr and incidental impurities.

11. The fuel rod of claim 9, wherein said cladding tube consists essentially of Nb, Sn, Fe, Zr and incidental impurities.

12. The fuel rod of claim 11, wherein said cladding further consists essentially of Cr.

13. A method of enhancing the corrosion resistance of a weld, comprising:

cooling a heat-affect zone of said weld at a rate of 5–70° C./sec.;

wherein said heat affected zone has been prepared by welding a cladding tube and an end plug together, wherein said cladding tube comprises 0.6 to 2.0% by weight of Nb, 0.5 to 1.5% by weight of Sn, 0.05 to 0.3% by weight of Fe, and Zr and incidental impurities.

14. The method of claim 13, wherein said cladding tube comprises 0.8 to 1.2% by weight of Nb, 0.8 to 1.1% by weight of Sn, 0.08 to 0.12% by weight of Fe, and Zr and incidental impurities.

15. The method of claim 13, wherein said cladding tube consists essentially of Nb, Sn, Fe, Zr and incidental impurities.

16. The method of claim 14, wherein said cladding tube consists essentially of Nb, Sn, Fe, Zr and incidental impurities.

17. The method of claim 15, wherein said cladding tube further consists essentially of Cr.

18. A method of making a fuel rod, comprising:

sealing by welding a cladding tube and end plugs, thereby forming beads and heat affected zones adjacent to said beads; and cooling said heat-affect zones at a rate of 5–70° C./sec.;

wherein said cladding tube comprises 0.6 to 2.0% by weight of Nb, 0.5 to 1.5% by weight of Sn, 0.05 to 0.3% by weight of Fe, and Zr and incidental impurities.

19. The method of claim 18, wherein said cladding tube comprises 0.8 to 1.2% by weight of Nb, 0.8 to 1.1% by weight of Sn, 0.08 to 0.12% by weight of Fe, and Zr and incidental impurities.

20. The product produced by the method of claim 13.

21. The product produced by the method of claim 18.

22. A method of generating electrical power, comprising:

generating heat by fission of a nuclear fuel inside the fuel rod of claim 7.

* * * * *